UNITED STATES PATENT OFFICE.

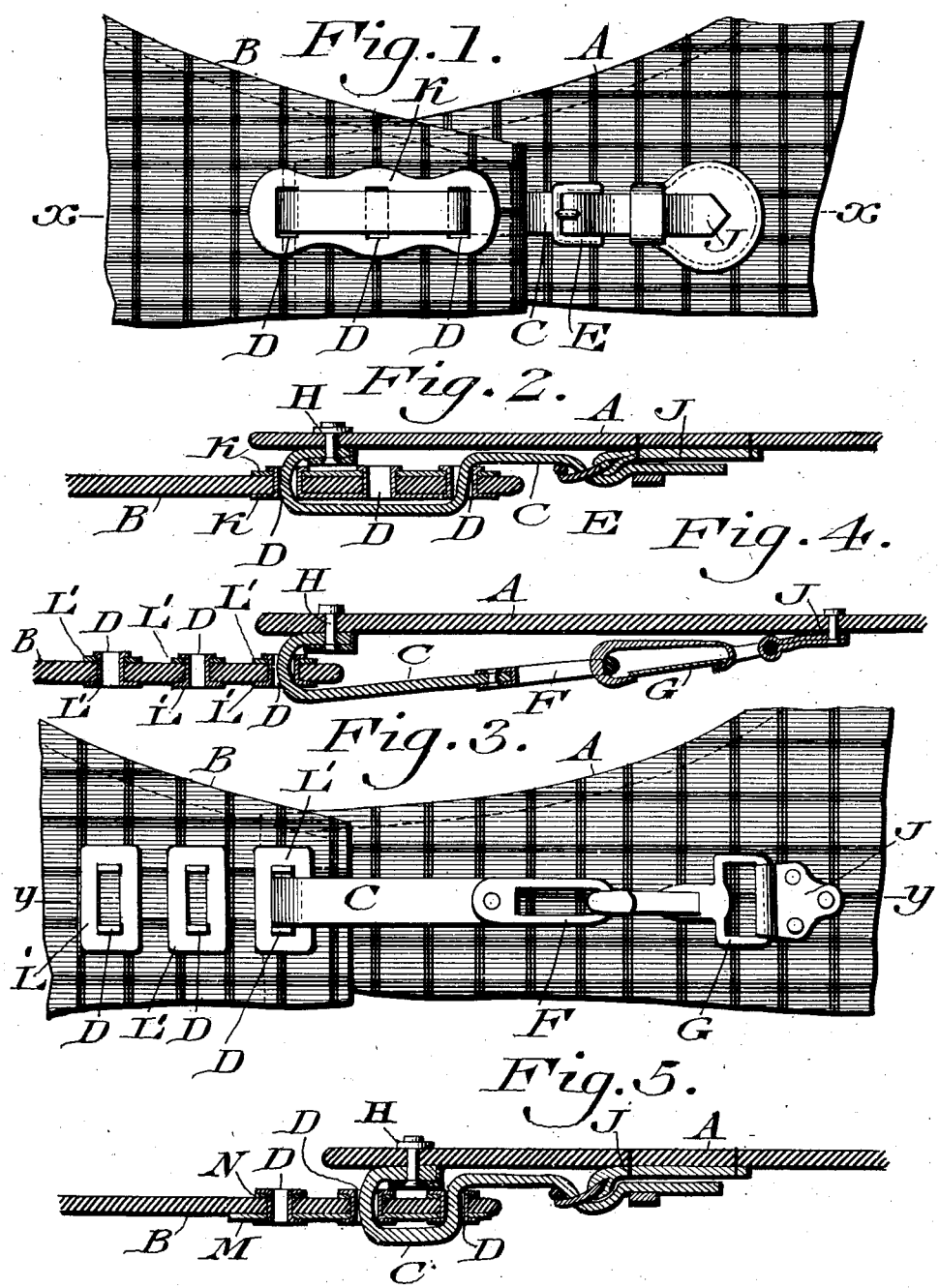

WALTER T. LEE, OF PHILADELPHIA, PENNSYLVANIA, ASSIGNOR TO WILLIAM B. RILEY AND EDGAR E. YOUNG, TRADING AS WILLIAM B. RILEY & CO., OF PHILADELPHIA, PENNSYLVANIA.

HORSE-BLANKET.

No. 919,038.  Specification of Letters Patent.  Patented April 20, 1909.

Application filed September 12, 1908. Serial No. 452,772.

*To all whom it may concern:*

Be it known that I, WALTER T. LEE, a citizen of the United States, residing in the city and county of Philadelphia, State of Pennsylvania, have invented a new and useful Horse-Blanket, of which the following is a specification.

My invention relates to a horse or animal blanket and consists of a fastening for the open front members of the same, whereby said members may be effectively closed and secured, and they are so sustained that they are prevented from dropping or sagging, and thus after adjustment on the animal preserve their normal appearance during use.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figures 1 and 3 represent front views of portions of horse blankets embodying my invention. Fig. 2 represents a section on line $x$—$x$, Fig. 1. Fig. 4 represents a section on line $y$—$y$, Fig. 3. Fig. 5 represents a section of another form of the invention.

Similar letters of reference indicate corresponding parts in the figures.

Referring to the drawing: A and B designate the front end members of a horse blanket, the same being adapted to be applied to the animal and closed as usual in such cases. In order to fasten said members when the blanket is in position on an animal, I employ the strap C, the plurality of passages D and the buckle E, as in Figs. 1 and 5, or the strap C, the plurality of passages D, the loop F and snap hook G, as in Figs. 3 and 4, but to said fastenings, I do not limit myself as they may be varied, it being noticed, however, that the strap C and buckle E, or strap C and snap hook G are carried on the same member, in the present case the member A, and the plurality of passages D are formed in the opposite member, in the present case member B.

The strap C is secured as at H to the member A near the forward terminal thereof, and the buckle E is secured to said member in the same plane as said strap, but at a short distance, in the present case to the right of the place of fastening of the strap as at J, the same being true of the snap hook G or like retaining means.

The passages D are variously formed being preferably metal bound though of course it will be understood that leather or like reinforcing means may be employed serving a similar purpose. In Figs. 1 and 2 I employ plates K, K, with one of which are connected a series of eyelets or gromets, which are clenched on the other plate, said plates occupying opposite faces of the member B of the blanket.

In Figs. 3 and 4, I show eyelets or gromets, the plates L, L of which are separate of each other.

In Fig. 5 the eyelets or gromets are separate of each other, but I employ a continuous plate M on one side of the blanket member and washers N on the other side thereof, the flanges of the eyelets or gromets clenching respectively on said plate and washers, but in all of the figures, the result is the same. The passages D are firmly formed in the blanket, and the latter is strengthened about the places of occupation of the passages and prevented, in a measure, from gathering, wrinkling, etc.

It will be seen that when a blanket is placed on the animal and the end members are closed to the required extent, the strap C is inserted in the relative passage D and drawn taut, after which it is fitted to the buckle E or the snap hook G, and so secured against return motion that the front of the blanket is held in closed position, it being evident that the strap may occupy either of the passages D, according to extent of overlap of the member B on the member A, and the strap may be reeved or laced through another passage other than the passage adjacent to the fastening H of the strap. By this provision, the end member B will be sustained at the various points of the portion of its length occupied by the passages D by the strap C bridging said portion from its place of departure from an adjacent passage, said portion thus being held-up or sustained and accordingly braced, whereby it will be prevented from dropping or sagging, and it is caused to retain its normal correct shape while in subsequent use.

Attention is directed to the fact in adjusting and tightening the strap C, the distance between the place of connection of the same with the member A and that of its engagement with the buckle or snap hook need not vary, so that the strap may occupy either of the passages D and yet have the same place of connection with the engaging member; viz., the buckle or snap hook. This is more advantageous in the use of the buckle, which is the preferred form, in that the strap requires but a single opening therein to receive the tongue of the buckle regardless of the extent that the member B overlaps the member A, and the disposal of said strap in either first, second or third passages, it being evident that the number of said passages may be increased if so desired.

Having thus described my invention, what I claim as new and desire to secure by Letters Patent, is:—

1. In a blanket fastening, a retaining member secured to one portion of a blanket adjacent the edge thereof, a reinforcing device having a plurality of openings therein secured to the other portion of said blanket adjacent the edge thereof, and a strap secured to said blanket adjacent said retaining member and adapted to interlace with said reinforcing device and engage said retaining member, whereby the opposite edges of said blanket are maintained substantially parallel.

2. In a blanket fastening, a retaining member secured to one portion of a blanket adjacent the edge thereof, a plate secured to the other portion of said blanket having a plurality of alined apertures adjacent the edge thereof, reinforcing devices coöperating with said apertures, and a strap on said blanket adjacent said retaining member, adapted to interlace with said apertures and engage said retaining member, whereby the opposite edges of said blanket are maintained substantially parallel.

WALTER T. LEE.

Witnesses:
E. HAYWARD FAIRBANKS,
ROBERT M. BARR.